(12) United States Patent
Bogan et al.

(10) Patent No.: US 12,277,780 B2
(45) Date of Patent: Apr. 15, 2025

(54) METHODS AND APPARATUS FOR IDENTIFYING SURFACE FEATURES IN THREE-DIMENSIONAL IMAGES

(71) Applicant: Cognex Corporation, Natick, MA (US)

(72) Inventors: Nathaniel Bogan, Natick, MA (US); Andrew Hoelscher, Somerville, MA (US); David J. Michael, Waban, MA (US)

(73) Assignee: Cognex Corporation, Natick, MA (US)

( * ) Notice: Subject to any disclaimer, the term of this patent is extended or adjusted under 35 U.S.C. 154(b) by 643 days.

(21) Appl. No.: 17/316,446

(22) Filed: May 10, 2021

(65) Prior Publication Data

US 2021/0350115 A1 Nov. 11, 2021

Related U.S. Application Data

(60) Provisional application No. 63/023,186, filed on May 11, 2020.

(51) Int. Cl.
*G06V 20/64* (2022.01)
*G06T 17/00* (2006.01)

(52) U.S. Cl.
CPC ............ *G06V 20/647* (2022.01); *G06T 17/00* (2013.01); *G06T 2200/04* (2013.01)

(58) Field of Classification Search
CPC ... G06V 20/647; G06T 17/00; G06T 2200/04; G06T 2207/10028; G06T 2207/20164; G06T 7/12
See application file for complete search history.

(56) References Cited

U.S. PATENT DOCUMENTS 9,327,406 B1 * 5/2016 Hinterstoisser ........ B25J 9/1697
10,462,450 B2 * 10/2019 Robert ...................... G06T 7/13
(Continued)

FOREIGN PATENT DOCUMENTS

WO WO-2019075276 A1 * 4/2019 ......... G06K 9/00201
WO WO-2019144289 A1 * 8/2019 ............. G06T 7/593

OTHER PUBLICATIONS

International Search Report and Written Opinion mailed Aug. 6, 2021 in connection with International Application No. PCT/US2021/031513.
(Continued)

*Primary Examiner* — Sean M Conner
*Assistant Examiner* — Stefano Anthony Dardano
(74) *Attorney, Agent, or Firm* — Wolf, Greenfield & Sacks, P.C.

(57) ABSTRACT

The techniques described herein relate to methods, apparatus, and computer readable media configured to identify a surface feature of a portion of a three-dimensional (3D) point cloud. Data indicative of a path along a 3D point cloud is received, wherein the 3D point cloud comprises a plurality of 3D data points. A plurality of lists of 3D data points are generated, wherein: each list of 3D data points extends across the 3D point cloud at a location that intersects the received path; and each list of 3D data points intersects the received path at different locations. A characteristic associated with a surface feature is identified in at least some of the plurality of lists of 3D data points. The identified characteristics are grouped based on one or more properties of the identified characteristics. The surface feature is identified based on the grouped characteristics.

20 Claims, 12 Drawing Sheets

(56) References Cited

U.S. PATENT DOCUMENTS

| | | | |
|---|---|---|---|
| 11,087,479 B1* | 8/2021 | Geraghty | ............... G06T 19/006 |
| 2015/0312550 A1 | 10/2015 | Robert | |
| 2020/0375561 A1* | 12/2020 | Huang | ................. A61B 6/0407 |

OTHER PUBLICATIONS

Ahmed et al., Edge and corner detection for unorganized 3d point clouds with application to robotic welding. 2018 IEEE/RSJ International Conference on Intelligent Robots and Systems (IROS). Oct. 1, 2018:7350-7355. 6 pages.

PCT/US2021/031513, Aug. 6, 2021, International Search Report and Written Opinion.

\* cited by examiner

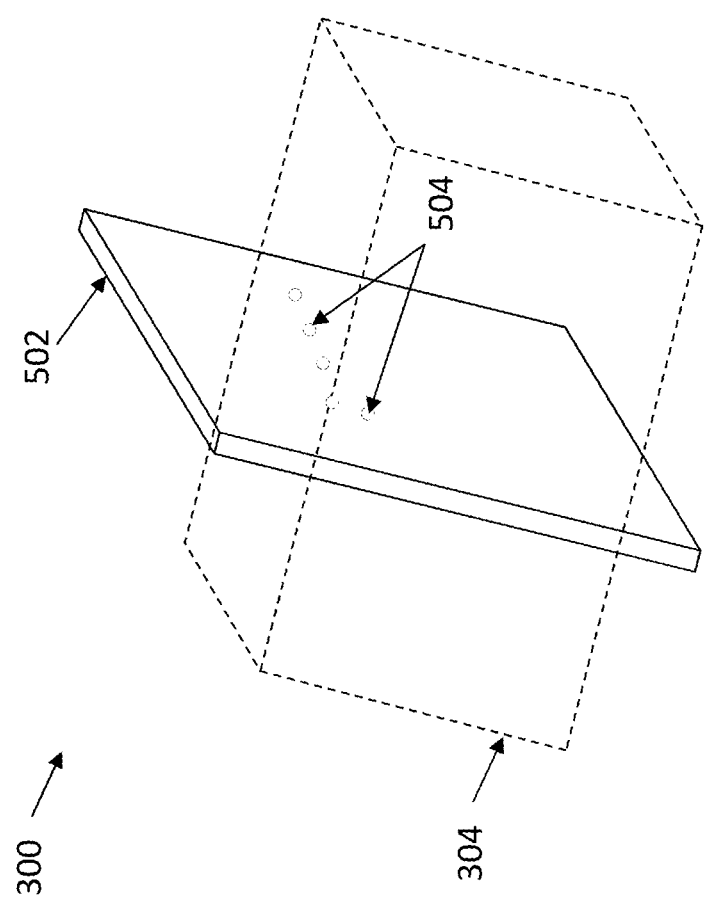

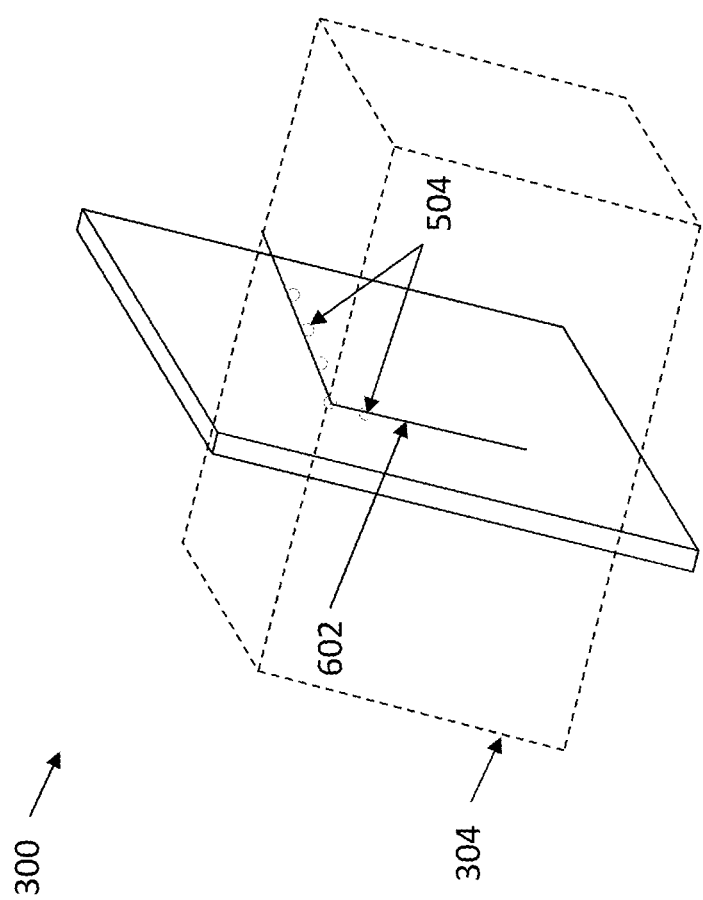

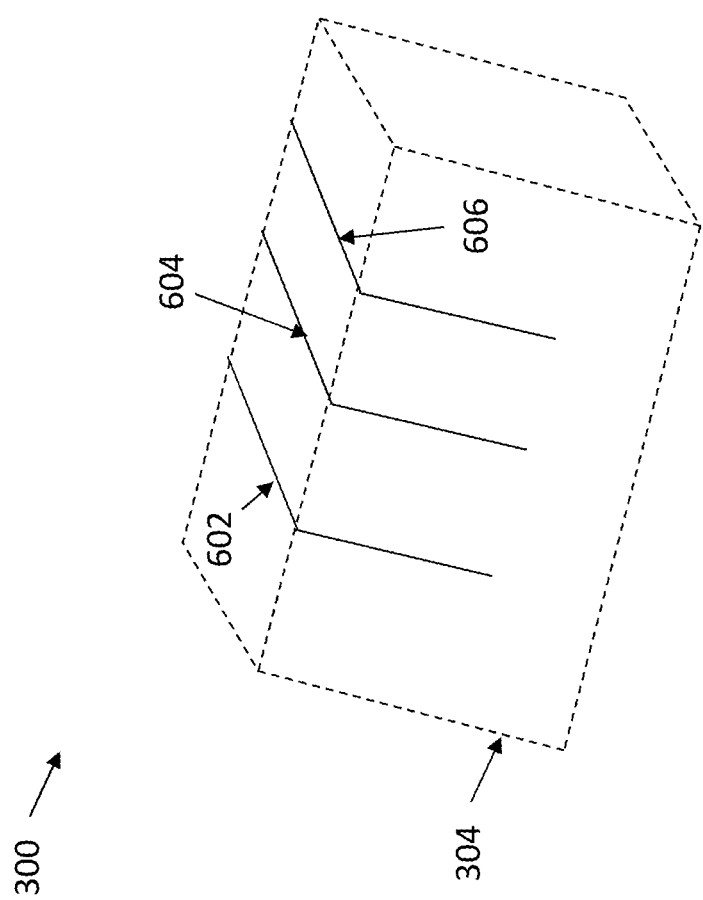

METHODS AND APPARATUS FOR IDENTIFYING SURFACE FEATURES IN THREE-DIMENSIONAL IMAGES

RELATED APPLICATIONS

This application claims priority under 35 U.S.C. § 119(e) to U.S. Provisional Application Ser. No. 63/023,186, titled "METHODS AND APPARATUS FOR IDENTIFYING SURFACE FEATURES IN THREE-DIMENSIONAL IMAGES," filed on May 11, 2020, which is herein incorporated by reference in its entirety.

TECHNICAL FIELD

The techniques described herein relate generally to methods and apparatus for machine vision, including techniques for identifying surface features of object captured in three-dimensional images.

BACKGROUND OF INVENTION

Machine vision systems can include robust imaging capabilities, including three-dimensional (3D) imaging devices. For example, 3D sensors can image a scene to generate a set of 3D points that each include an (x, y, z) location within a 3D coordinate system (e.g., where the z axis of the coordinate system represents a distance from the 3D imaging device). Such 3D imaging devices can generate a 3D point cloud, which includes a set of 3D points captured during a 3D imaging process. However, the sheer number of 3D point in 3D point clouds can be massive (e.g., compared to 2D data of a scene). Additionally, 3D point clouds may only include pure 3D data points, and therefore may not include data indicative of relations between/among the 3D points, or other information, such as surface normal information, it can be complicated to process 3D points with no data indicative of relations among other points. Therefore, while 3D point clouds can provide a large amount of 3D data, performing machine vision tasks on 3D point cloud data can be complicated, time consuming, require significant processing resources, and/or the like.

SUMMARY OF INVENTION

In accordance with the disclosed subject matter, apparatus, systems, and methods are provided for improved machine vision techniques, and in particular for improved machine vision techniques that can locate surface features of objects captured in 3D images. For example, the techniques can locate folds, ridges, and/or other crease edges in surfaces of the 3D images.

Some aspects relate to a computerized method for identifying a surface feature of a portion of a three-dimensional (3D) point cloud. The method includes receiving data indicative of a path along a 3D point cloud, wherein the 3D point cloud comprises a plurality of 3D data points. The method includes generating a plurality of lists of 3D data points, wherein each list of 3D data points extends across the 3D point cloud at a location that intersects the received path, and each list of 3D data points intersects the received path at different locations. The method includes identifying, in at least some of the plurality of lists of 3D data points, a characteristic associated with a surface feature. The method includes grouping the identified characteristics based on one or more properties of the identified characteristics. The method includes identifying, based on the grouped characteristics, the surface feature of the portion of the 3D point cloud.

According to some examples, generating the plurality of lists of 3D data points comprises, for each list of 3D data points, determining the set of 3D data points based on a plane disposed at the location to generate the list of 3D data points. The plane can be orthogonal to the received path, such that the planes used to generate each of the list of 3D data points are parallel.

According to some examples, the identified surface feature of the portion of the 3D point cloud is a crease edge, and the characteristic associated with the crease edge is a corner.

According to some examples, grouping the identified characteristics comprises fitting a line to the identified characteristics. Fitting a line to the identified features can include fitting a first line to a first portion of the identified features and fitting a second line to a second portion of the identified features, determining the first line comprises a first orientation that is within a threshold difference of a second orientation of the second line, and combining the first line and the second line into a single representative line.

According to some examples, receiving the data indicative of a path along the 3D point cloud comprises receiving data indicative of a specified region of interest. The specified region of interest can include a width, a length, and a height, and the path is specified based on the width, length and height.

According to some examples, the method includes determining a count of the identified features, and determining, based on the count, a coverage of the surface feature along the portion of the 3D point cloud. The method can include determining a score of each of the identified features, and determining, based on the count of the identified features and the score of each of the identified features, an overall score of the feature.

According to some examples, the path is a linear path specified by a direction, a curved path, a circular path, a spiral path, or some combination thereof.

Some embodiments relate to a non-transitory computer-readable media comprising instructions that, when executed by one or more processors on a computing device, are operable to cause the one or more processors to execute the method of any of the embodiments herein.

Some embodiments relate to a system comprising a memory storing instructions, and a processor configured to execute the instructions to perform the method of any of the embodiments herein.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto. It is to be understood that the phraseology and terminology employed herein are for the purpose of description and should not be regarded as limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead

FIG. 5B is a diagram showing a list of 3D data points that are along the plane of FIG. 5A, according to some embodiments.

FIGS. 6A-6C is a diagram showing examples of corners identified based on the lists of 3D data points of FIGS. 5B-5C, according to some embodiments.

FIG. 7 is a diagram showing an exemplary grouping of the identified corners from FIGS. 6A-6C, according to some embodiments.

DETAILED DESCRIPTION OF INVENTION

The techniques described herein provide for data reduction techniques that can be used to analyze 3D point cloud images. The inventors have appreciated that conventional machine vision techniques may suffer from significant inefficiencies when using 3D images, such as 3D point cloud data, voxel grids, and/or 3D volume representations. For example, 3D point clouds often include hundreds of thousands or millions of points. Directly interpreting such a massive number of 3D points in space can be quite challenging. Further, 3D point clouds typically do not include information about spatial relationships among the 3D points. Therefore, it can be time consuming and require significant processing resources to identify object features in 3D images. Some techniques attempt to directly identify local regions in a point cloud by searching for properties of a feature (e.g., a crease edge), and then chain the identified regions to identify an overall surface feature. However, such techniques can be slow and rudimentary, because it can be challenging to locally identify object-like characteristics of arbitrary orientation.

The inventors have developed technological improvements to machine vision techniques to address these and other inefficiencies. According to some embodiments, the techniques can include accessing and/or receiving a search volume and search path, and searching along the path to locate (e.g., identify and/or localize) features of object surfaces in 3D image data. As an illustrative example, the techniques can be used to locate a crease edge (e.g., a fold in a folded piece of paper, a corner of a box, and/or the like) in various orientations (e.g., in concave or convex views). Crease edges and/or other object features (e.g., arcs, circles, etc.) can be useful for various machine vision tasks, such as to measure and/or inspect manufactured parts.

In the following description, numerous specific details are set forth regarding the systems and methods of the disclosed subject matter and the environment in which such systems and methods may operate, etc., in order to provide a thorough understanding of the disclosed subject matter. In addition, it will be understood that the examples provided below are exemplary, and that it is contemplated that there are other systems and methods that are within the scope of the disclosed subject matter.

Figure 1:
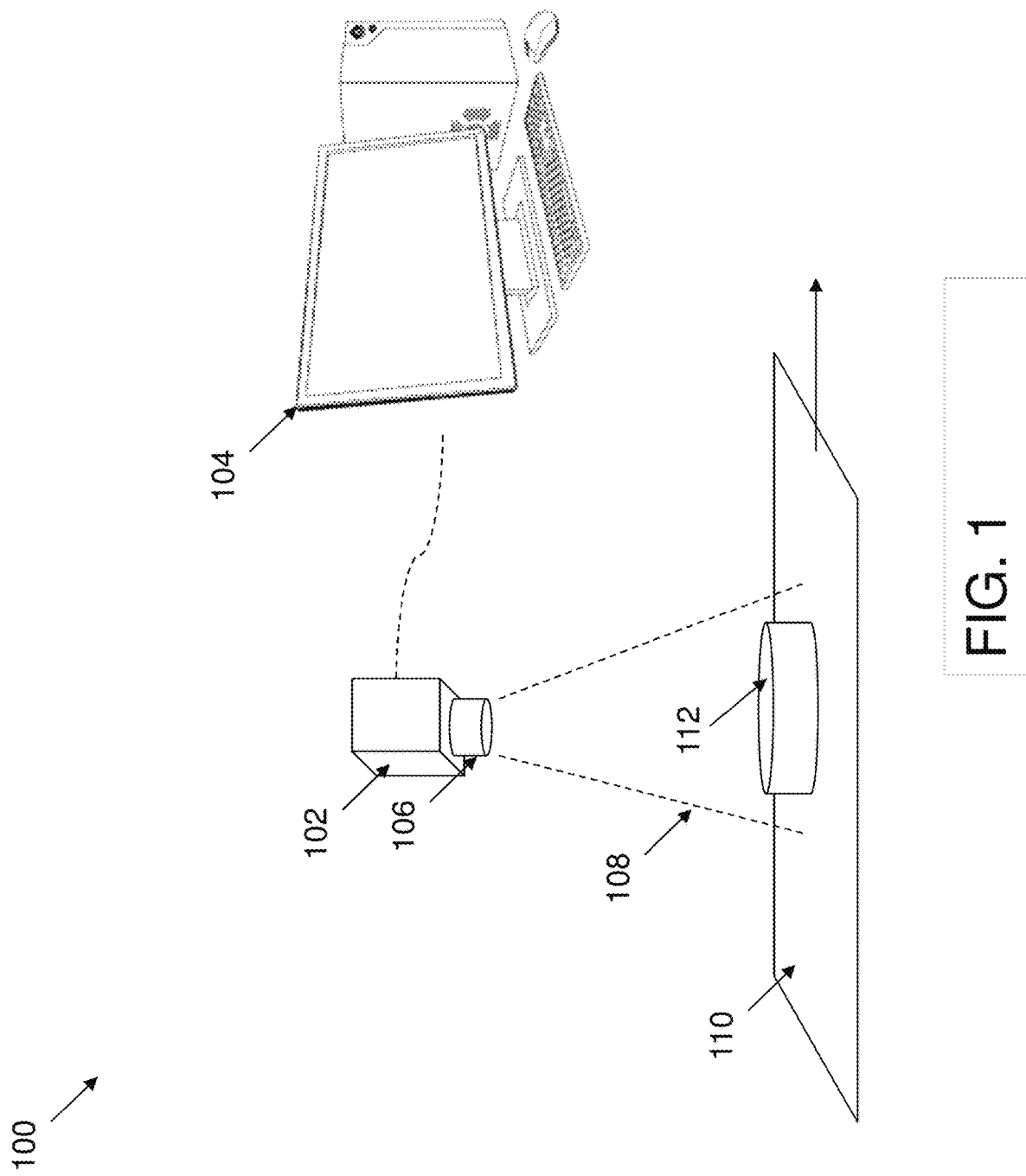
FIG. 1 is a diagram showing an exemplary machine vision system, according to some embodiments.

FIG. 1 shows an exemplary machine vision system 100, according to some embodiments. The exemplary machine vision system 100 includes a camera 102 (or other imaging acquisition device) and a computer 104. While only one camera 102 is shown in FIG. 1, it should be appreciated that a plurality of cameras can be used in the machine vision system (e.g., where a point cloud is merged from that of multiple cameras). The computer 104 includes one or more processors and a human-machine interface in the form of a computer display and optionally one or more input devices (e.g., a keyboard, a mouse, a track ball, etc.). Camera 102 includes, among other components, a lens 106 and a camera sensor element (not illustrated). The lens 106 includes a field of view 108, and the lens 106 focuses light from the field of view 108 onto the sensor element. The sensor element generates a digital image of the camera field of view 108 and provides that image to a processor that forms part of computer 104. As shown in the example of FIG. 1, object 112 travels along a conveyor 110 into the field of view 108 of the camera 102. The camera 102 can generate one or more digital images of the object 112 while it is in the field of view 108 for processing, as discussed further herein. In operation, the conveyor can contain a plurality of objects. These objects can pass, in turn, within the field of view 108 of the camera 102, such as during an inspection process. As such, the camera 102 can acquire at least one image of each observed object 112.

In some embodiments, the camera 102 is a three-dimensional (3D) imaging device. As an example, the camera 102 can be a 3D sensor that scans a scene line-by-line, such as the DS-line of laser profiler 3D displacement sensors available from Cognex Corp., the assignee of the present application. According to some embodiments, the 3D imaging device can generate a set of (x, y, z) points (e.g., where the z axis adds a third dimension, such as a distance from the 3D imaging device). The 3D imaging device can use various 3D image generation techniques, such as shape-from-shading, stereo imaging, time of flight techniques, projector-based techniques, and/or other 3D generation technologies. In some embodiments the machine vision system 100 includes a two-dimensional imaging device, such as a two-dimensional (2D) CCD or CMOS imaging array. In some embodiments, two-dimensional imaging devices generate a 2D array of brightness values.

In some embodiments, the machine vision system processes the 3D data from the camera 102. The 3D data received from the camera 102 can include, for example, a point cloud and/or a range image. A point cloud can include a group of 3D points that are on or near the surface of a solid object. For example, the points may be presented in terms of their coordinates in a rectilinear or other coordinate system. In some embodiments, other information, such a mesh or grid structure indicating which points are neighbors on the object's surface, may optionally also be present. In some embodiments, information about surface features including curvatures, surface normal, edges, and/or color and albedo information, either derived from sensor measurements or computed previously, may be included in the input point clouds. In some embodiments, the 2D and/or 3D data may be obtained from a 2D and/or 3D sensor, from a CAD or other solid model, and/or by preprocessing range images, 2D images, and/or other images.

According to some embodiments, the group of 3D points can be a portion of a 3D point cloud within user specified regions of interest and/or include data specifying the region of interest in the 3D point cloud. For example, since a 3D point cloud can include so many points, it can be desirable to specify and/or define one or more regions of interest (e.g., to limit the space to which the techniques described herein are applied).

Examples of computer 104 can include, but are not limited to a single server computer, a series of server computers, a single personal computer, a series of personal computers, a mini computer, a mainframe computer, and/or a computing cloud. The various components of computer 104 can execute one or more operating systems, examples of which can include but are not limited to: Microsoft Windows Server™; Novell Netware™; Redhat Linux™, Unix, and/or a custom operating system, for example. The one or more processors of the computer 104 can be configured to process operations stored in memory connected to the one or more processors. The memory can include, but is not limited to, a hard disk drive; a flash drive, a tape drive; an optical drive; a RAID array; a random-access memory (RAM); and a read-only memory (ROM).

As described herein, techniques are provided for identifying and localizing object features, such as crease edges, in surfaces in 3D images. According to some embodiments, the techniques can include selecting a set of planes based on a specified path and determining corresponding lists of points from the 3D image based on the intersection of the surface of the plane and the points in the 3D image. As described herein, the lists of points can be a linear array of points. It should be appreciated that the points can provide a 1D manifold (e.g., a 1D path along the surface of an object) in 3D. The region that includes a list of points can be a 2D plane. Therefore, the list of points can provide a 2D path along the 2D plane. The techniques can analyze each list of points to extract object characteristics, such as corners and/or other points of high curvature (e.g., at a given scale, along the path of the contour). The extracted characteristics can be grouped based on their 3D proximity and/or other properties. According to some examples, the techniques can fit a line to the extracted features to identify overall surface features of objects in the 3D image.

Figure 2:
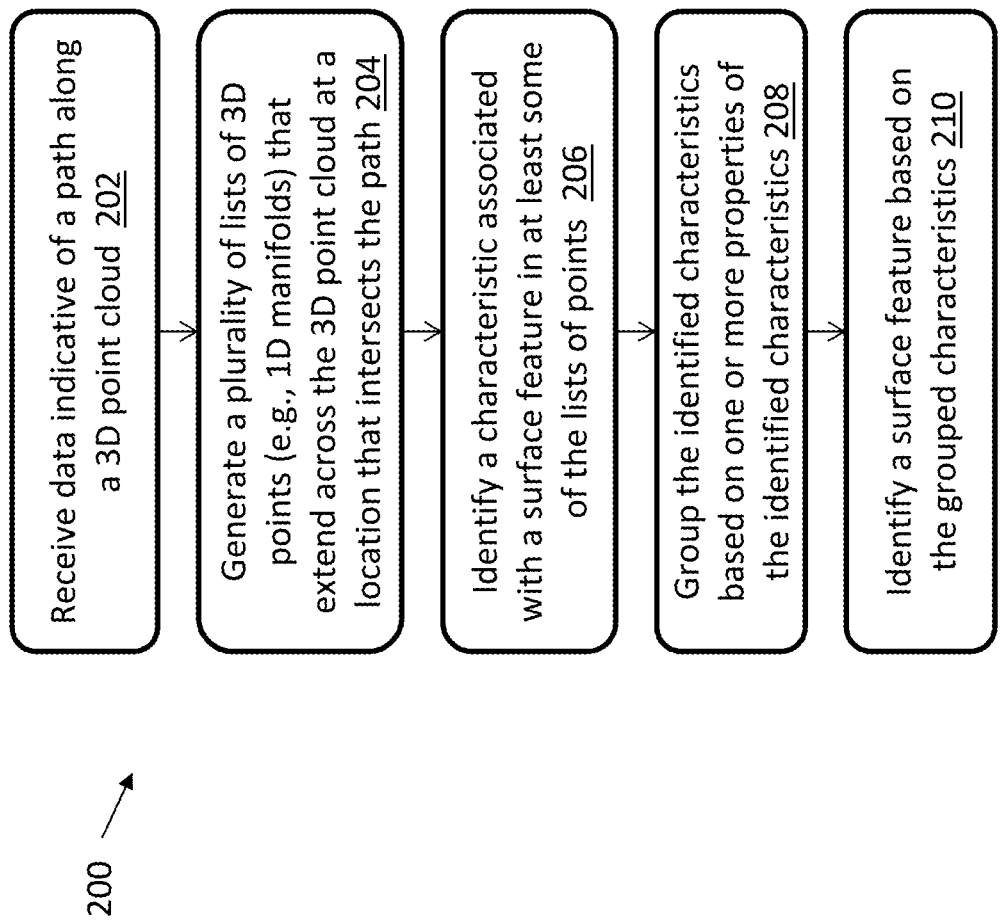
FIG. 2 is a flow chart showing an exemplary computerized method for identifying a surface feature of a portion of a 3D point cloud, according to some embodiments.
Figure 3:
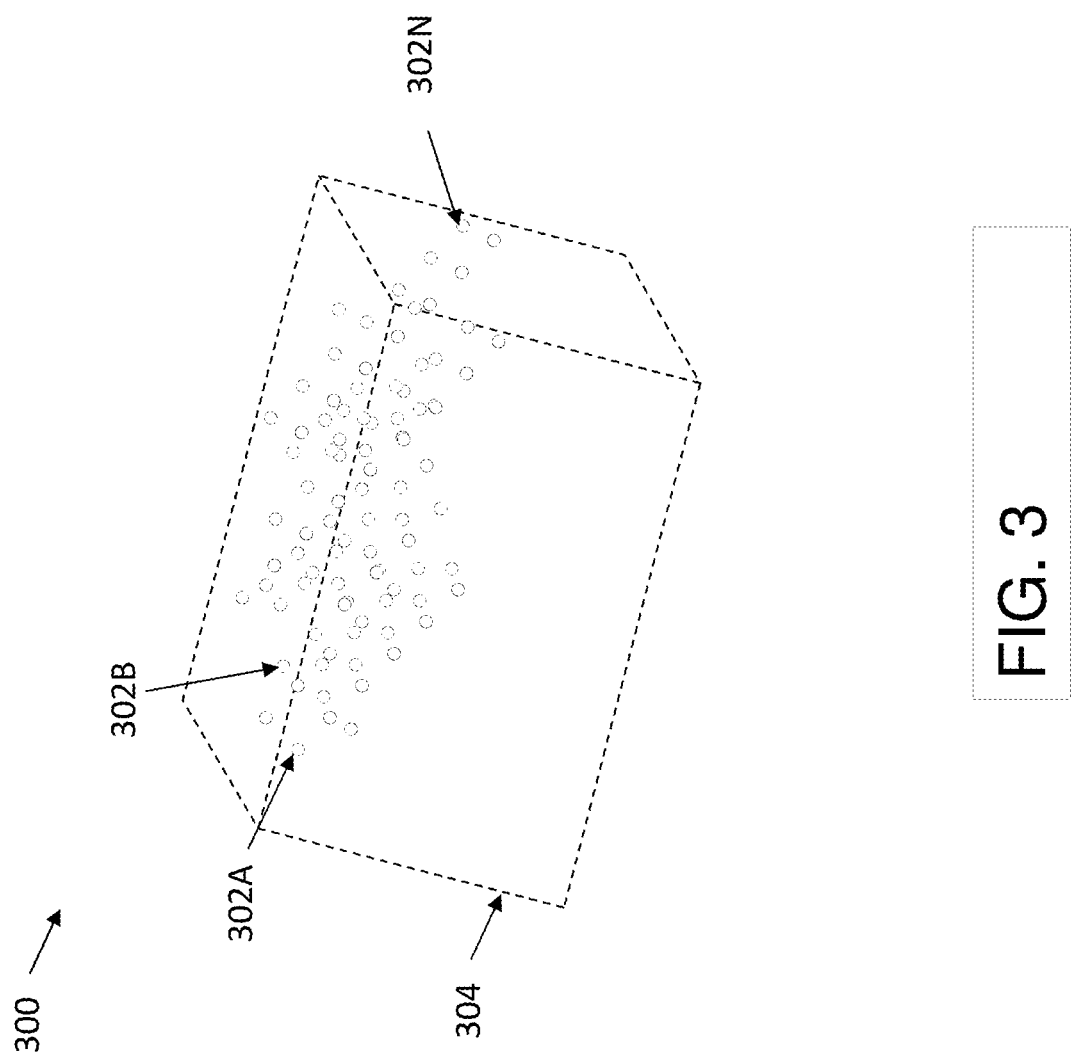
FIG. 3 is a diagram showing an example of a 3D point cloud, according to some embodiments.

FIG. 2 is a flow chart showing an exemplary computerized method 200 for identifying a surface feature (e.g., a crease edge) of a portion of a 3D point cloud, according to some embodiments. The 3D point cloud includes a large number of 3D data points, and can included hundreds of thousands, or millions, of 3D data points, as described herein. FIG. 3 is a diagram showing an example of a 3D point cloud 300, according to some embodiments. For illustrative purposes, the 3D point cloud 300 only shows a small number of 3D points 302A, 302B, through 302N, collectively referred to as 3D points 302. Also for illustrative purposes, FIG. 3 shows the outline of a box 304 (e.g., such as a box that is present in the scene captured by a 3D imaging device). It should be appreciated that the 3D point cloud 300 does not include information indicating the box 304. Rather, the 3D point cloud 300 just includes data of the 3D points 302, and may not even include data indicating relations among the 3D points 302 themselves. For example, the 3D point cloud 300 may simply include the (x, y, z) position of each 3D point 302 in the 3D point cloud 300. The point cloud shown in FIG. 3 will be used to provide examples of the techniques described herein. It should be appreciated, therefore, that the techniques are not intended to be limited by these examples.

Figure 4:
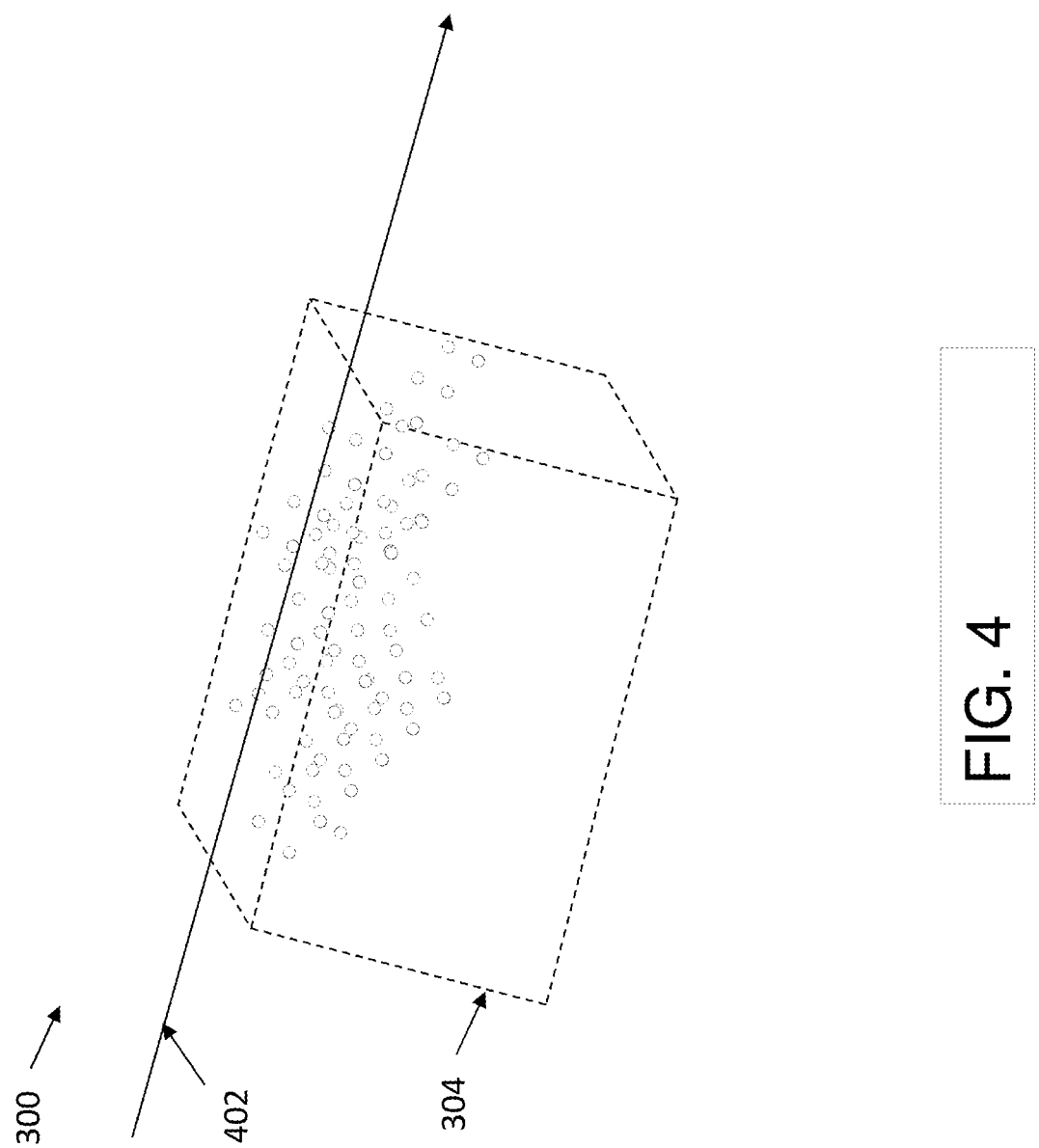
FIG. 4 is a diagram showing an example of a path through the point cloud of FIG. 3, according to some embodiments.

At step 202, the machine vision system (e.g., the machine vision system 100 of FIG. 1) accesses and/or receives data indicative of a path along a 3D point cloud. FIG. 4 shows an example of a path 402 through the point cloud 300 of FIG. 3, according to some embodiments. The path 402 is a linear path. The path 402 can be specified, for example, as a direction (e.g., a direction specified using a coordinate system associated with the 3D point cloud 300). However, it should be appreciated that while path 402 is a linear path, this is for illustrative purposes only and is not intended to be limiting. Various shapes and types of paths can be used, as desired. For example, the path can include a curved path, a circular path, a spiral path, a rectangular path, and/or the like.

According to some embodiments, the path can be specified using a region of interest in the 3D point cloud. For example, the machine vision system can receive and/or access a specified region of interest (e.g., a box, a sphere, etc.) that includes data indicative of a path. The path can be specified with respect to the region of interest. For example, if the region of interest is a box, the region of interest can include data indicative of a width, a length, and a height, and can include data specifying the path based on the width, length and height. As another example, the region of interest can be a cylinder and the region of interest can include data specifying the path based on a cylindrical coordinate system associated with the cylinder.

At step 204, the machine vision system generates a plurality of lists of 3D data points. Each list of 3D data points extends across the 3D point cloud at a location that intersects the path. Therefore, each list of 3D data points can capture a 1D manifold of points that may be along the surface of an object captured by the 3D point cloud. According to some embodiments, the lists of points can be generated using a set of two-dimensional planes that extend along the path, such that each list of points is within the plane and/or within a threshold distance of the plane. The planes can have various arrangements along the path. For example, the planes can be parallel to each other and extend along the direction of a straight path. As another example, the planes can be orthogonal to a curved path along the direction of the path. Each plane, and therefore each list of 3D data points, intersects the received path at different locations and/or directions.

Figure 5A:
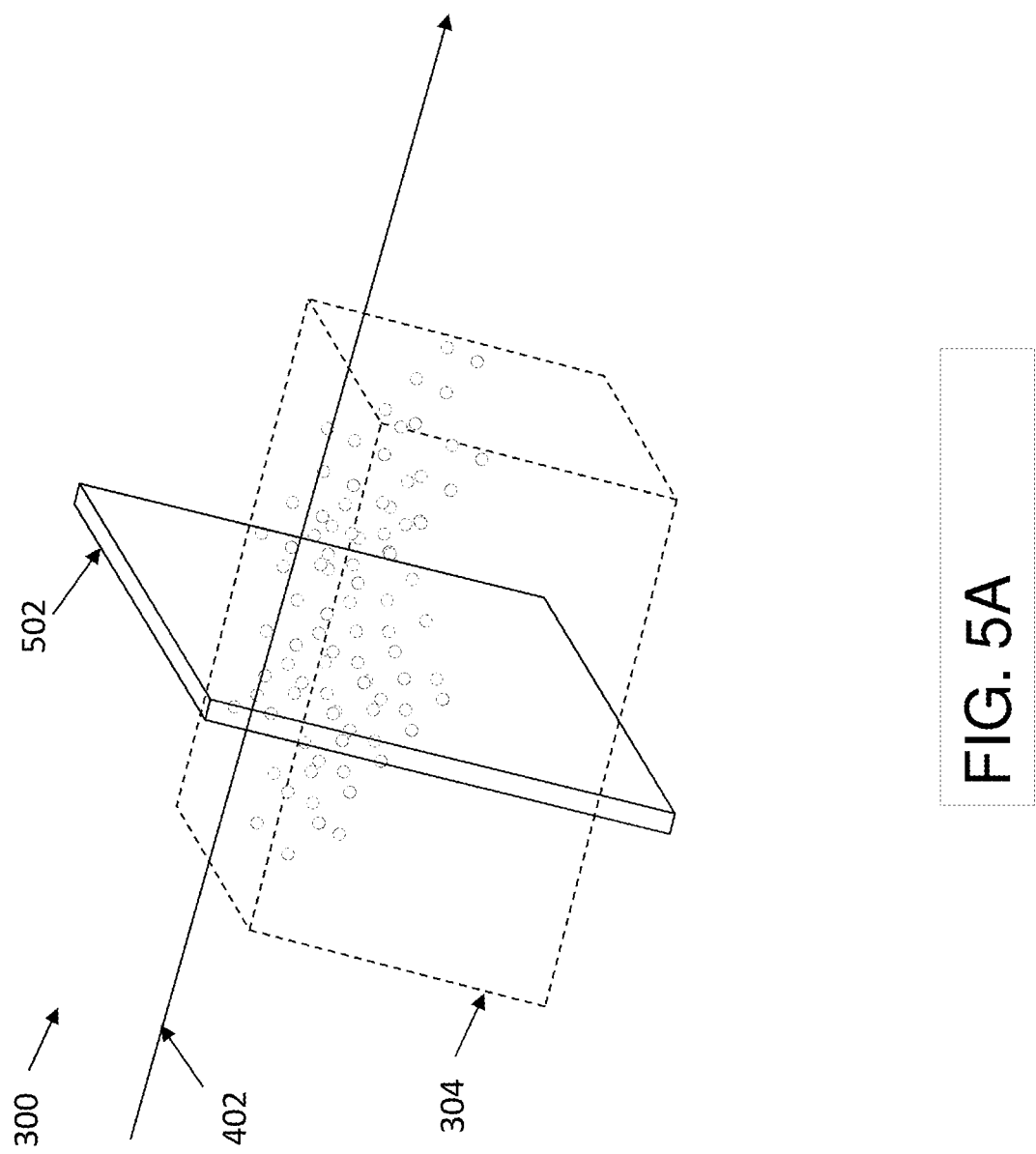
FIG. 5A is a diagram showing an example of a plane used to determine a list of 3D data points, according to some embodiments.
Figure 5C:
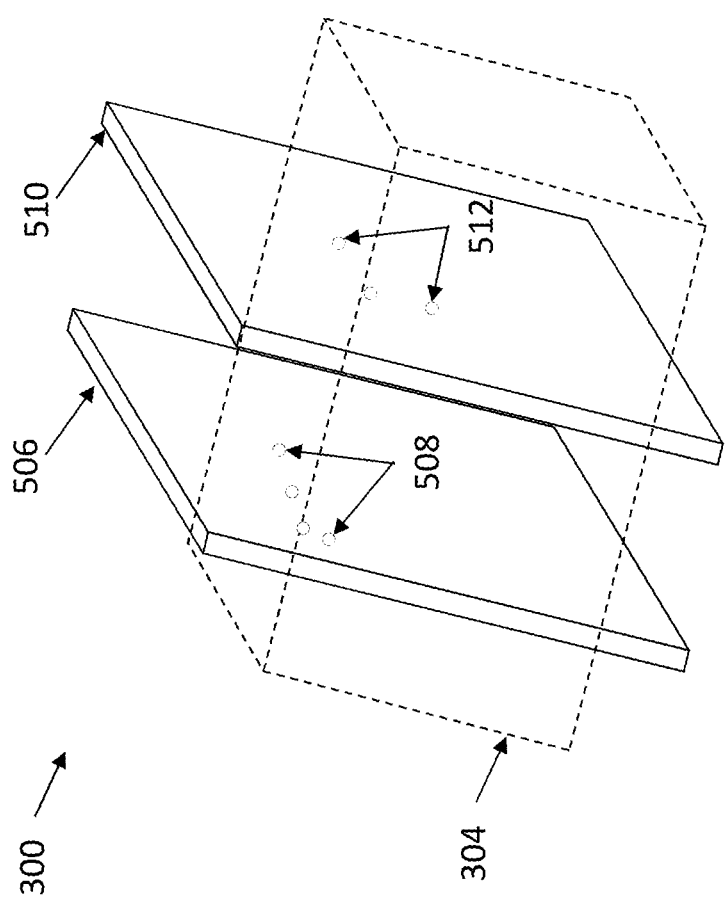
FIG. 5C is a diagram showing two further planes and associated lists of 3D data points, according to some embodiments.

FIG. 5A shows an example of a plane 502 used to determine a list of 3D data points, according to some embodiments. In this example, the plane 502 is disposed orthogonal to the path 402, but as described herein this is for exemplary purposes and is not intended to be limiting. As shown in FIG. 5B, the machine vision system determines the list of 3D data points 504 by identifying the points that are along the plane 502. FIG. 5C shows two further lists of 3D data points, according to some embodiments. As shown in FIG. 5C, plane 506 is used to identify the associated list of 3D data points 508, and plane 510 is used to identify the associated list of 3D data points 512, according to some embodiments. Planes 502, 506 and 510 are parallel to each other in this example.

Figure 6B:
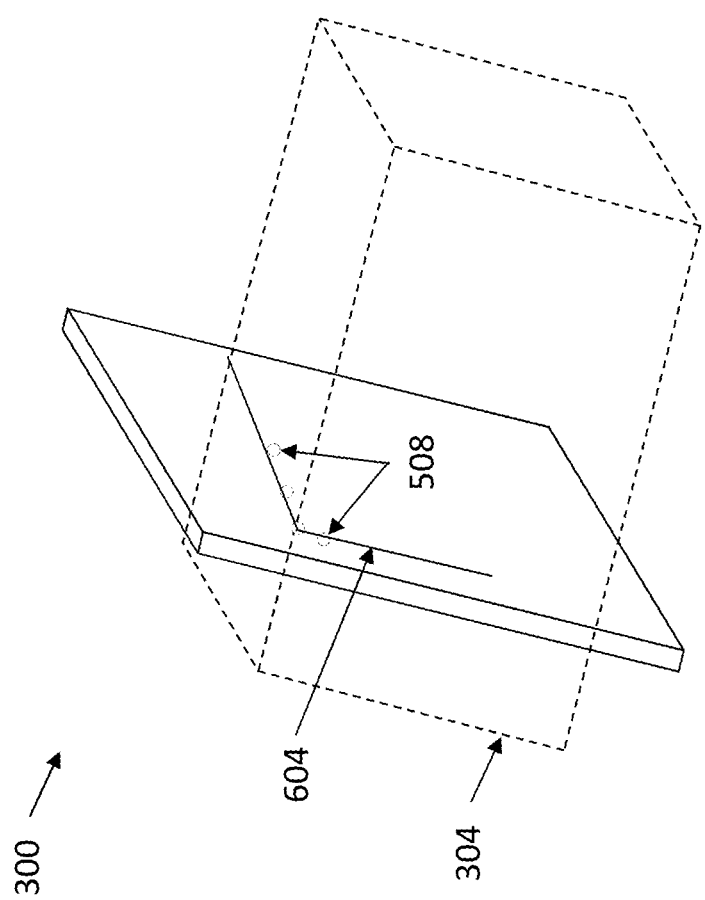
Figure 6C:
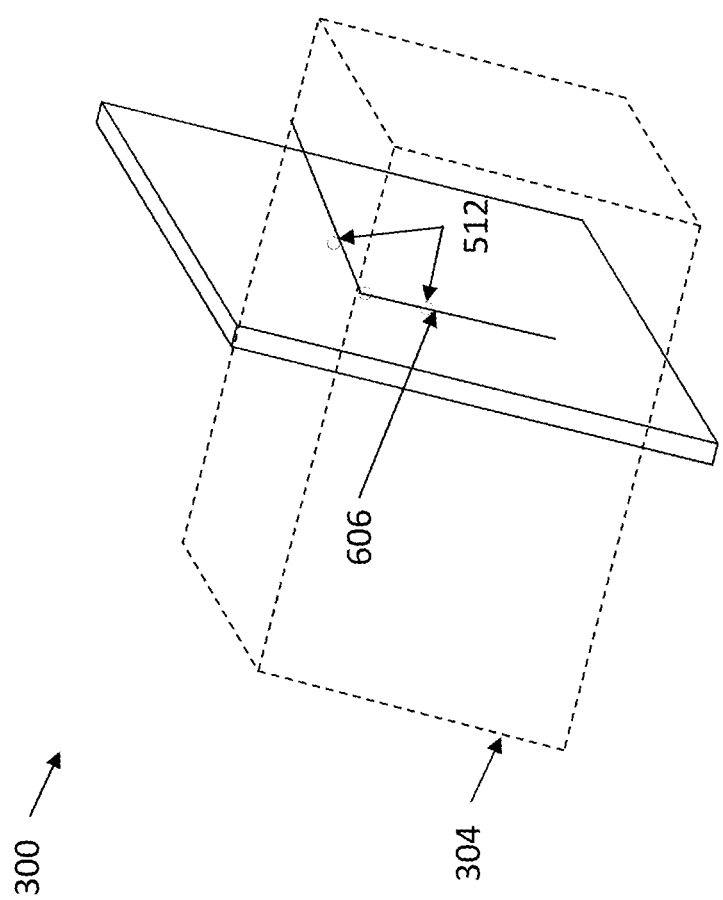

At step 206, the machine vision system identifies, in at least some of the plurality of lists of 3D data points, a characteristic associated with a surface feature. The characteristic can be, for example, a defining feature of an object, such as a ridge, crease, corner, edge, and/or the like. For example, the techniques can identify corners or other points of high curvature, at a given scale, along the path of the contour. FIGS. 6A-6C show examples of corners 602, 604 and 606 identified in the lists of 3D data points 504, 508 and 512 of FIGS. 5B-5C, according to some embodiments. For illustrative purposes, the corners 602, 604 and 606 are illustrated with lines along the points, although this is done for illustrative purposes since the machine vision system may internally store data indicative of the corners in various formats. For example, the data indicative of the corners can include a point and/or one or more of a set of rays, an angle between the set of rays, a score of the corner, data indicative of whether the corner is concave or convex, and/or the like.

At step 208, the machine vision system groups the identified characteristics based on one or more properties of the identified characteristics. For example, the machine vision system can group the identified characteristics based on the proximity of the identified characteristics in 3D and/or based on other properties (e.g., such as based on whether grouping the characteristics forms a path within an angle of the expected direction of the characteristics). FIG. 7 shows an exemplary grouping of the identified corners 602, 604 and 606 from FIGS. 6A-6C, according to some embodiments. For example, the machine vision system can determine that corners each have a same orientation (or similar orientation that is within a threshold) within the coordinate system of the 3D point cloud and group the three corners as potentially related to each other.

Figure 8:
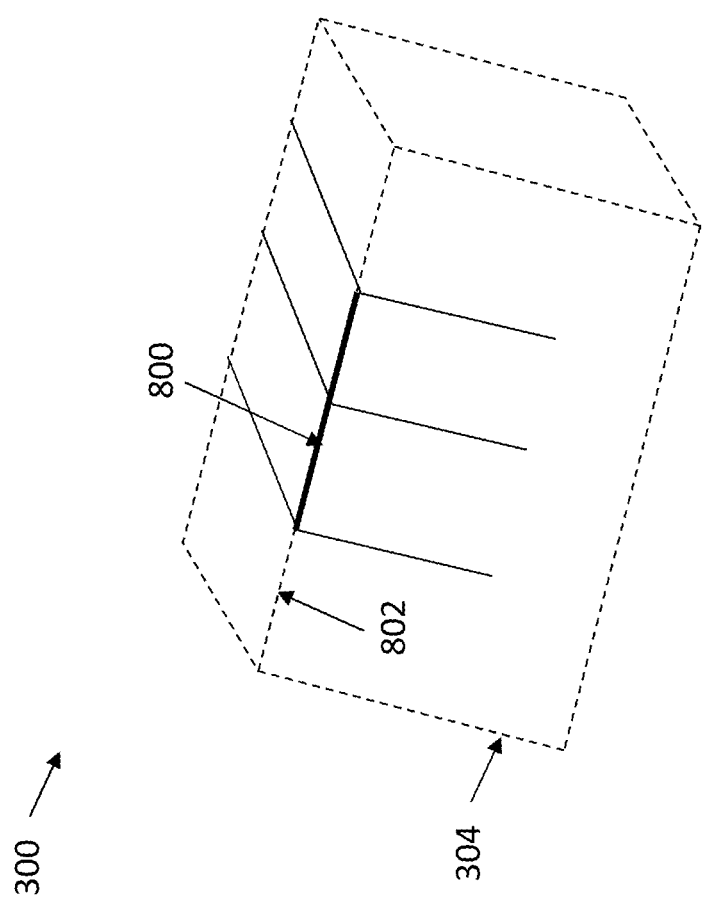
FIG. 8 is a diagram showing an example of an identified crease edge, according to some embodiments.

At step 210, the machine vision system identifies, based on the grouped characteristics, a surface feature of a portion of the 3D point cloud. According to some embodiments, the machine vision system can fit a line to each group of identified characteristics. For example, the machine vision system can determine a best-fit line to each group, such as by using least squares fit techniques, RANSAC, and/or the like. FIG. 8 shows an example of an identified crease edge 800, according to some embodiments. As shown in FIG. 8, the crease edge 800 represents a portion of a side 802 of the 3D object 304 captured by the 3D point cloud 300. Therefore, the techniques can be used to identify features within the 3D point cloud that can be used to ultimately identify an object captured by the 3D point cloud.

As described herein, the 3D point cloud may exhibit some noise, such that the determined features may have some threshold noise difference (e.g., compared to the features of the true object captured by the machine vision system). According to some embodiments, a line can be fit to the identified features by fitting multiple lines to different groups of features and combining lines that are within a threshold orientation. For example, the machine vision system may fit a first line to a first portion of the identified features, and fit a second line to a second portion of the identified features. The machine vision system can determine that the first line has a first orientation that is within a threshold difference of a second orientation of the second line (e.g., the lines are approximately co-linear), and can combine the first line and the second line into a single representative line.

According to some embodiments, the machine vision system can be configured to use a threshold (e.g., a separation or orientation threshold) to determine whether or not to identify multiple lines. For example, if the machine vision system is imaging objects with linear features that are a small distance apart (e.g., on the order of microns), the machine vision system can be configured with a threshold accordingly so that the machine vision system identifies two lines instead of combining the points/lines into just one line. As an illustrative example, if an object has lines that are known to be 10 microns apart, the threshold can be set based on the known distance (e.g., to 10 microns, 12 microns, etc.) such that if the machine vision system determines two lines are less than the threshold distance apart, the machine vision system will resolve two lines instead of combining the two lines into just one line. As another example, the machine vision system can use the threshold when determining which 3D points belong to associated lines or features.

According to some embodiments, the machine vision system can determine a coverage of a surface feature in the point cloud. For example, the machine vision system can determine a count of the identified features, and determine, based on the count, a coverage of the surface feature along the portion of the 3D point cloud.

According to some embodiments, the machine vision system can score the determined feature. For example, the machine vision system can determine a score of each of the identified features. The machine vision system can determine, based on the count of the identified features and the score of each of the identified features, an overall score of the feature.

Various scoring techniques can be used to score each identified feature. For example, the machine vision system can score individual corners based on how many samples lie close to the straight line segments that form the corner. Then the machine vision system can score the found crease edges based on the quantity and quality (e.g. co-linearity) of matching corners. The scoring techniques can be designed to determine how reliable the edge is that is determined based on the identified corners (e.g., rather than to determine perfectly formed the edge is).

As described herein, FIGS. 3-8 are simplified diagrams used to illustrate the techniques described herein, and various aspects can be modified without departing from the spirit of the techniques described herein. For example, the techniques can extract non-linear features (e.g., creases) by chaining edgelets or corners and reporting the chains as the result. In some embodiments, the machine vision system can analyze 3D points radially along the circumference of a circular path. Such techniques can be used, for example, to accurately fit a circle at an approximate location (e.g., to obtain radius and/or other dimensions of a circular feature). As another example, the techniques can extract linear creases in all possible directions by applying the process described herein at a set of extraction plane orientations. As a further example, the techniques described herein can be repeated with a variety of corner detection scales (e.g., in an exponential sequence) to find crease edges at a variety of scales, and optionally select the highest scoring results from groups that are close in space. Such an approach can, for example, eliminate the need to specify the scale at all of the surface feature.

In some embodiments, the machine vision system can be configured to operate at a desired resolution. At a high resolution a linear feature may appear non-linear (e.g., wavy) due to surface imperfections and/or imaging artifacts, while the linear feature may appear more linear at a coarser/lower resolution. For example, high-resolution imaging devices can extract detail at the micron scale, such that ridges of machined aluminum parts that may not otherwise be visible to the human eye are detected by the imaging device. In some embodiments, the resolution can be controlled by downsampling the point cloud prior to identifying surface features. The machine vision system can consolidate the number of 3D points into voxels, such as by reducing the 3D points in a voxel down to a single 3D point. For example, for one or more voxels of a plane, the machine vision system can determining a plurality of 3D data points in the voxel, determine a single 3D data point for the voxel based on the 3D data points, and store the single 3D data point in the voxel. According to some embodiments, the machine vision system can compute the centroid of the 3D points in the voxel. According to some embodiments, the techniques can determine the centroid of a voxel based on the points in the current voxel and/or the points in neighboring voxels. For example, the centroid can be computed based on the points in the current voxel and the points in the twenty-six (26) voxels that neighbor the current voxel (e.g., nine below, nine above, and eight around the sides of the voxel).

The techniques described herein can be used for various machine vision applications. For example, the techniques can be used for object detection, inspection, analysis, and/or the like. As an example, the techniques can be used for object measurement, such as by using the edges to measure the length/size of a particular crease, to compare distances to other creases, and/or the like. As another example, for inspection the techniques can be used to inspect objects to ensure creases are properly formed in the object, properly positioned/disposed on the object, and/or the like.

Techniques operating according to the principles described herein may be implemented in any suitable manner. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

Further, some techniques described above comprise acts of storing information (e.g., data and/or instructions) in certain ways for use by these techniques. In some implementations of these techniques—such as implementations where the techniques are implemented as computer-executable instructions—the information may be encoded on a computer-readable storage media. Where specific structures are described herein as advantageous formats in which to store this information, these structures may be used to impart a physical organization of the information when encoded on the storage medium. These advantageous structures may then provide functionality to the storage medium by affecting operations of one or more processors interacting with the information; for example, by increasing the efficiency of computer operations performed by the processor(s).

In some, but not all, implementations in which the techniques may be embodied as computer-executable instructions, these instructions may be executed on one or more suitable computing device(s) operating in any suitable computer system, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, a computer-readable storage medium accessible via one or more networks and accessible by the device/processor, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing device (co-located or geographically distributed) dedicated to executing the techniques described herein, one or more Field-Programmable Gate Arrays (FPGAs) for carrying out the techniques described herein, or any other suitable system.

A computing device may comprise at least one processor, a network adapter, and computer-readable storage media. A computing device may be, for example, a desktop or laptop personal computer, a personal digital assistant (PDA), a smart mobile phone, a server, or any other suitable computing device. A network adapter may be any suitable hardware and/or software to enable the computing device to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media may be adapted to store data to be processed and/or instructions to be executed by processor. The processor enables processing of data and execution of instructions. The data and instructions may be stored on the computer-readable storage media.

A computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

Various aspects are described in this disclosure, which include, but are not limited to, the following aspects:

1. A computerized method for identifying a surface feature of a portion of a three-dimensional (3D) point cloud, the method comprising:
    receiving data indicative of a path along a 3D point cloud, wherein the 3D point cloud comprises a plurality of 3D data points;
    generating a plurality of lists of 3D data points, wherein:
        each list of 3D data points extends across the 3D point cloud at a location that intersects the received path; and
        each list of 3D data points intersects the received path at different locations;
    identifying, in at least some of the plurality of lists of 3D data points, a characteristic associated with a surface feature;
    grouping the identified characteristics based on one or more properties of the identified characteristics; and identifying, based on the grouped characteristics, the surface feature of the portion of the 3D point cloud.

2. The method of 1, wherein generating the plurality of lists of 3D data points comprises, for each list of 3D data points, determining the set of 3D data points based on a plane disposed at the location to generate the list of 3D data points.

3. The method of 2, wherein the plane is orthogonal to the received path, such that the planes used to generate each of the lists of 3D data points are parallel.

4. The method of 1-3, wherein the identified surface feature of the portion of the 3D point cloud is a crease edge, and the characteristic associated with the crease edge is a corner.

5. The method of 1-4, wherein grouping the identified characteristics comprises fitting a line to the identified characteristics.

6. The method of 5, wherein fitting a line to the identified features comprises:
    fitting a first line to a first portion of the identified features and fitting a second line to a second portion of the identified features;
    determining the first line comprises a first orientation that is within a threshold difference of a second orientation of the second line; and
    combining the first line and the second line into a single representative line.

7. The method of 1-6, wherein receiving the data indicative of a path along the 3D point cloud comprises receiving data indicative of a specified region of interest.

8. The method of 7, wherein the specified region of interest comprises a width, a length, and a height, and the path is specified based on the width, length and height.

9. The method of 1-8, further comprising:
    determining a count of the identified features;
    determining, based on the count, a coverage of the surface feature along the portion of the 3D point cloud.

10. The method of 9, further comprising:
    determining a score of each of the identified features;
    determining, based on the count of the identified features and the score of each of the identified features, an overall score of the feature.

11. The method of 1-10, wherein the path is:
    a linear path specified by a direction;
    a curved path;
    a circular path;
    a spiral path; or some combination thereof.

12. A non-transitory computer-readable media comprising instructions that, when executed by one or more processors on a computing device, are operable to cause the one or more processors to identify a surface feature of a portion of a three-dimensional (3D) point cloud, comprising:
    receiving data indicative of a path along a 3D point cloud, wherein the 3D point cloud comprises a plurality of 3D data points;
    generating a plurality of lists of 3D data points, wherein:
        each list of 3D data points extends across the 3D point cloud at a location that intersects the received path; and
        each list of 3D data points intersects the received path at different locations;
    identifying, in at least some of the plurality of lists of 3D data points, a characteristic associated with a surface feature;
    grouping the identified characteristics based on one or more properties of the identified characteristics; and
    identifying, based on the grouped characteristics, the surface feature of the portion of the 3D point cloud.

13. The non-transitory computer-readable media of 12, wherein generating the plurality of lists of 3D data points comprises, for each list of 3D data points, determining the set of 3D data points based on a plane disposed at the location to generate the list of 3D data points.

14. The non-transitory computer-readable media of 12-13, wherein grouping the identified characteristics comprises fitting a line to the identified characteristics, comprising:
    fitting a first line to a first portion of the identified features and fitting a second line to a second portion of the identified features;
    determining the first line comprises a first orientation that is within a threshold difference of a second orientation of the second line; and
    combining the first line and the second line into a single representative line.

15. The non-transitory computer-readable media of 12-14, wherein receiving the data indicative of a path along the 3D point cloud comprises receiving data indicative of a specified region of interest comprising a width, a length, and a height, and the path is specified based on the width, length and height.

16. The non-transitory computer-readable media of 12-15, wherein the instructions are operable to cause the one or more processors to perform:
    determining a count of the identified features;
    determining, based on the count, a coverage of the surface feature along the portion of the 3D point cloud.

17. A system comprising a memory storing instructions, and at least one processor configured to execute the instructions to identify a surface feature of a portion of a three-dimensional (3D) point cloud, comprising:
    receiving data indicative of a path along a 3D point cloud, wherein the 3D point cloud comprises a plurality of 3D data points;
    generating a plurality of lists of 3D data points, wherein:
        each list of 3D data points extends across the 3D point cloud at a location that intersects the received path; and
        each list of 3D data points intersects the received path at different locations;
    identifying, in at least some of the plurality of lists of 3D data points, a characteristic associated with a surface feature;
    grouping the identified characteristics based on one or more properties of the identified characteristics; and
    identifying, based on the grouped characteristics, the surface feature of the portion of the 3D point cloud.

18. The system of 17, wherein generating the plurality of lists of 3D data points comprises, for each list of 3D data points, determining the set of 3D data points based on a plane disposed at the location to generate the list of 3D data points.

19. The system of 17-18, wherein grouping the identified characteristics comprises fitting a line to the identified characteristics, comprising:
    fitting a first line to a first portion of the identified features and fitting a second line to a second portion of the identified features;
    determining the first line comprises a first orientation that is within a threshold difference of a second orientation of the second line; and
    combining the first line and the second line into a single representative line.

20. The system of 17-19, wherein receiving the data indicative of a path along the 3D point cloud comprises receiving data indicative of a specified region of interest comprising a width, a length, and a height, and the path is specified based on the width, length and height.

The invention claimed is:

1. A computerized method for identifying a surface feature of a portion of a three-dimensional (3D) point cloud, the method comprising:
   receiving data indicative of a path along a 3D point cloud, wherein the 3D point cloud comprises a plurality of 3D data points;
   generating a plurality of lists of 3D data points, wherein:
      each list of 3D data points extends across the 3D point cloud at a location that intersects the received path; and
      each list of 3D data points intersects the received path at different locations such that individual lists of the plurality of lists of 3D data points are separate from each other;
   identifying, in at least some of the plurality of lists of 3D data points, a characteristic of a set of characteristics, wherein each characteristic of the set is associated with a different surface feature;
   grouping the identified characteristics based on one or more properties of the identified characteristics; and
   identifying, based on the grouped characteristics, a surface feature of the portion of the 3D point cloud, wherein the surface feature is associated with the identified characteristics and the surface feature extends through the 3D point cloud along the grouped identified characteristics.

2. The method of claim 1, wherein generating the plurality of lists of 3D data points comprises, for each list of 3D data points, determining the list of 3D data points based on a plane disposed at the location to generate the list of 3D data points.

3. The method of claim 2, wherein the plane is orthogonal to the received path, such that the planes used to generate each of the lists of 3D data points are parallel.

4. The method of claim 1, wherein the identified surface feature of the portion of the 3D point cloud is a crease edge, and the characteristic associated with the crease edge is a corner.

5. The method of claim 1, wherein grouping the identified characteristics comprises fitting a line to the identified characteristics.

6. The method of claim 5, wherein fitting a line to the identified characteristics comprises:
   fitting a first line to a first portion of the identified characteristics and fitting a second line to a second portion of the identified characteristics;
   determining the first line comprises a first orientation that is within a threshold difference of a second orientation of the second line; and
   combining the first line and the second line into a single representative line.

7. The method of claim 1, wherein receiving the data indicative of a path along the 3D point cloud comprises receiving data indicative of a specified region of interest.

8. The method of claim 7, wherein the specified region of interest comprises a width, a length, and a height, and the path is specified based on the width, length and height.

9. The method of claim 1, further comprising:
   determining a count of the identified characteristics;
   determining, based on the count, a coverage of the surface feature along the portion of the 3D point cloud.

10. The method of claim 9, further comprising:
    determining a score of each of the identified characteristics;
    determining, based on the count of the identified characteristics and the score of each of the identified characteristics, an overall score of the surface feature.

11. The method of claim 1, wherein the path is:
    a linear path specified by a direction;
    a curved path;
    a circular path;
    a spiral path; or some combination thereof.

12. A non-transitory computer-readable media comprising instructions that, when executed by one or more processors on a computing device, are operable to cause the one or more processors to identify a surface feature of a portion of a three-dimensional (3D) point cloud, comprising:
    receiving data indicative of a path along a 3D point cloud, wherein the 3D point cloud comprises a plurality of 3D data points;
    generating a plurality of lists of 3D data points, wherein:
       each list of 3D data points extends across the 3D point cloud at a location that intersects the received path; and
       each list of 3D data points intersects the received path at different locations such that individual lists of the plurality of lists of 3D data points are separate from each other;
    identifying, in at least some of the plurality of lists of 3D data points, a characteristic of a set of characteristics, wherein each characteristic of the set is associated with a different surface feature;
    grouping the identified characteristics based on one or more properties of the identified characteristics; and
    identifying, based on the grouped characteristics, a surface feature of the portion of the 3D point cloud, wherein the surface feature is associated with the identified characteristics and the surface feature extends through the 3D point cloud along the grouped identified characteristics.

13. The non-transitory computer-readable media of claim 12, wherein generating the plurality of lists of 3D data points comprises, for each list of 3D data points, determining the list of 3D data points based on a plane disposed at the location to generate the list of 3D data points.

14. The non-transitory computer-readable media of claim 12, wherein grouping the identified characteristics comprises fitting a line to the identified characteristics, comprising:
    fitting a first line to a first portion of the identified characteristics and fitting a second line to a second portion of the identified characteristics;
    determining the first line comprises a first orientation that is within a threshold difference of a second orientation of the second line; and
    combining the first line and the second line into a single representative line.

15. The non-transitory computer-readable media of claim 12, wherein receiving the data indicative of a path along the 3D point cloud comprises receiving data indicative of a specified region of interest comprising a width, a length, and a height, and the path is specified based on the width, length and height.

16. The non-transitory computer-readable media of claim 12, wherein the instructions are operable to cause the one or more processors to perform:
    determining a count of the identified characteristics;
    determining, based on the count, a coverage of the surface feature along the portion of the 3D point cloud.

17. A system comprising a memory storing instructions, and at least one processor configured to execute the instructions to identify a surface feature of a portion of a three-dimensional (3D) point cloud, comprising:
receiving data indicative of a path along a 3D point cloud, wherein the 3D point cloud comprises a plurality of 3D data points;
generating a plurality of lists of 3D data points, wherein:
each list of 3D data points extends across the 3D point cloud at a location that intersects the received path; and
each list of 3D data points intersects the received path at different locations such that individual lists of the plurality of lists of 3D data points are separate from each other;
identifying, in at least some of the plurality of lists of 3D data points, a characteristic of a set of characteristics, wherein each characteristic of the set is associated with a different surface feature;
grouping the identified characteristics based on one or more properties of the identified characteristics; and
identifying, based on the grouped characteristics, a surface feature of the portion of the 3D point cloud, wherein the surface feature is associated with the identified characteristics and the surface feature extends through the 3D point cloud along the grouped identified characteristics.

18. The system of claim 17, wherein generating the plurality of lists of 3D data points comprises, for each list of 3D data points, determining the list of 3D data points based on a plane disposed at the location to generate the list of 3D data points.

19. The system of claim 17, wherein grouping the identified characteristics comprises fitting a line to the identified characteristics, comprising:
fitting a first line to a first portion of the identified characteristics and fitting a second line to a second portion of the identified characteristics;
determining the first line comprises a first orientation that is within a threshold difference of a second orientation of the second line; and
combining the first line and the second line into a single representative line.

20. The system of claim 17, wherein receiving the data indicative of a path along the 3D point cloud comprises receiving data indicative of a specified region of interest comprising a width, a length, and a height, and the path is specified based on the width, length and height.

* * * * *